US008866973B1

(12) United States Patent
Wang

(10) Patent No.: US 8,866,973 B1
(45) Date of Patent: Oct. 21, 2014

(54) METHOD FOR ZOOMING PICTURE WITH SINGLE KEY

(71) Applicant: Jia-Chi Wang, Taipei (TW)

(72) Inventor: Jia-Chi Wang, Taipei (TW)

(73) Assignee: I/O Interconnect Inc., Taipei (TW)

( * ) Notice: Subject to any disclaimer, the term of this patent is extended or adjusted under 35 U.S.C. 154(b) by 0 days.

(21) Appl. No.: 14/085,662

(22) Filed: Nov. 20, 2013

Related U.S. Application Data

(60) Provisional application No. 61/902,162, filed on Nov. 9, 2013.

(51) Int. Cl.
H04N 9/64 (2006.01)
H04N 5/44 (2011.01)
H04N 5/445 (2011.01)

(52) U.S. Cl.
CPC ................................. *H04N 5/44513* (2013.01)
USPC .......................................... 348/581; 348/563

(58) Field of Classification Search
USPC .............. 348/581, 240.2, 569, 561, 563, 598, 348/600; 345/660, 661, 665, 667, 668; 701/457; 715/800, 767; 358/1.2, 528
See application file for complete search history.

(56) References Cited

U.S. PATENT DOCUMENTS

| | | | | |
|---|---|---|---|---|
| 8,731,824 B1* | 5/2014 | Alaniz et al. | .................. | 701/457 |
| 2004/0046796 A1* | 3/2004 | Fujita | .............................. | 345/767 |
| 2010/0017112 A1* | 1/2010 | Sim | ............................... | 701/201 |
| 2012/0303629 A1* | 11/2012 | Klein et al. | .................... | 707/741 |
| 2013/0150093 A1* | 6/2013 | Seol et al. | ...................... | 455/457 |

* cited by examiner

Primary Examiner — Victor Kostak

(57) ABSTRACT

A method for zooming a picture on a display without a touch-screen is disclosed. The method includes the steps of: a) displaying a picture and a zoom key on a screen; b) defining a rectangular coordinate system in the picture with an origin at a center of the picture; c) defining the zoom key as a point P (x, y) in the perpendicular coordinate system; d) drawing a line through the point P and a reflection point Q at (−x, −y); e) defining points Q1 and Q2 on the line beside the point Q, wherein a distance d between the points Q and Q1 is the same as that between the points Q and Q2, and double the distance d is defined as a simulated operating distance; and; and f) creating a zoom event object corresponding to the simulated operating distance.

7 Claims, 4 Drawing Sheets

METHOD FOR ZOOMING PICTURE WITH SINGLE KEY

RELATED APPLICATIONS

This application claims priority to provisional applications U.S. 61/902,162, filed Nov. 9, 2013.

BACKGROUND OF THE INVENTION

1. Technical Field

The invention relates to showing of a picture on a display, particularly to zooming in or out the picture with a touchscreen.

2. Related Art

Almost all smartphones and tablet computers are provided with a multi-touch screen. Such a multi-touch screen possesses a touch sensing surface's (trackpad or touchscreen) ability to recognize the presence of two or more points of contact with the surface. This plural-point awareness is often used to implement advanced functionality such as pinch to zoom or activating predefined programs. The pinch-to-zoom function is very useful in browsing pictures or web pages.

In recent years, some users prefer to connect their smartphones or tablets to a large-sized TV set or monitor for enlarging the picture. However, almost all TV sets and monitors are not provided with a touchscreen. Thus the pinch-to-zoom function cannot be performed on a TV set or monitor once a smartphone or tablet has been connected to the TV set or monitor. This will really cause inconvenience to users who are used to browse pictures of smartphones or tablets on a TV set.

SUMMARY OF THE INVENTION

An object of the invention is to provide method for zooming a picture with a single key, which can simulate a pinch-to-zoom function only with clicking a single virtual key.

To accomplish the above object, the method of the invention includes the steps of: a) displaying a picture and a zoom key on a screen; b) defining a rectangular coordinate system in the picture with an origin at a center of the picture; c) defining the zoom key as a point P in the perpendicular coordinate system and defining coordinates thereof as (x, y); d) drawing a line through the point P and a reflection point Q at (−x, −y); e) defining points Q1 and Q2 on the line beside the point Q, wherein the point Q1 is between the origin and the point Q, the point Q is between the points Q1 and Q2, a distance d between the points Q and Q1 is the same as that between the points Q and Q2, and double the distance d (2d) is defined as a simulated operating distance; and; and f) creating a zoom event object corresponding to the simulated operating distance.

DETAILED DESCRIPTION OF THE INVENTION

Figure 1:
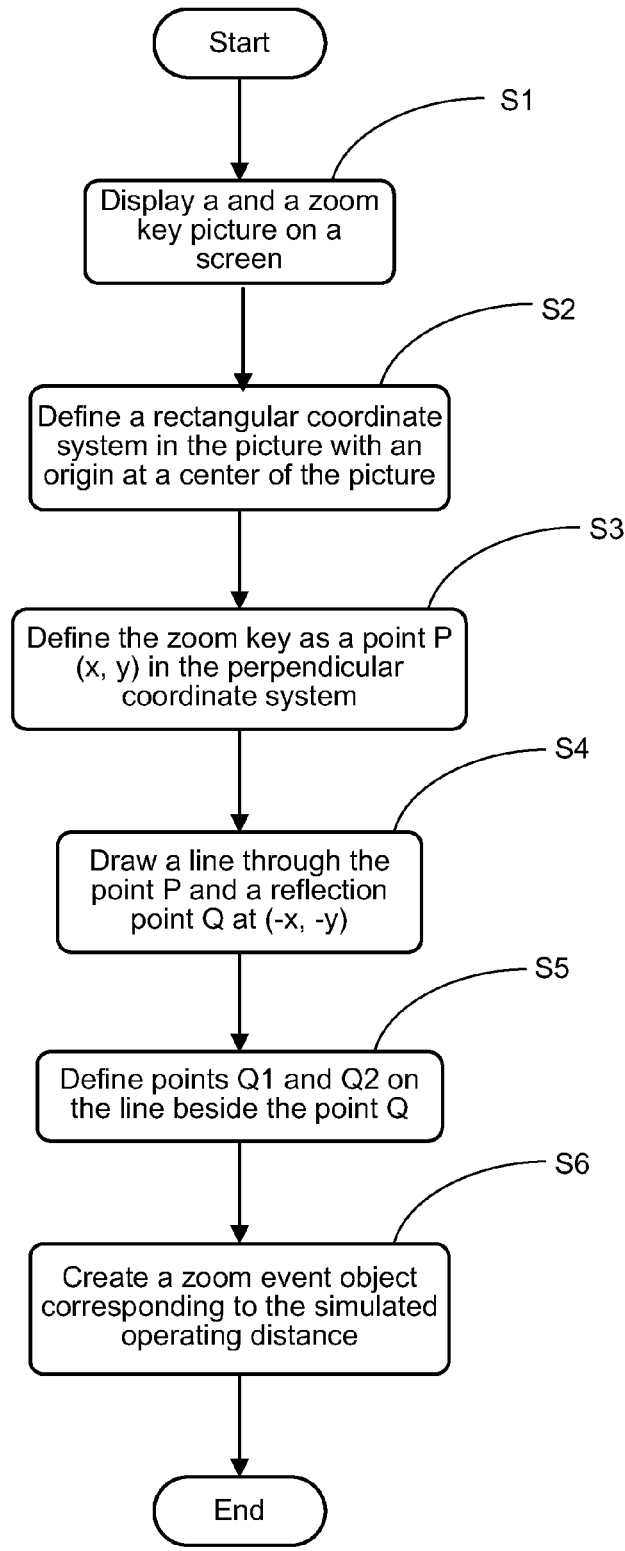
FIG. 1 is a schematic view showing a handheld computer connected to a TV set.
Figure 2:
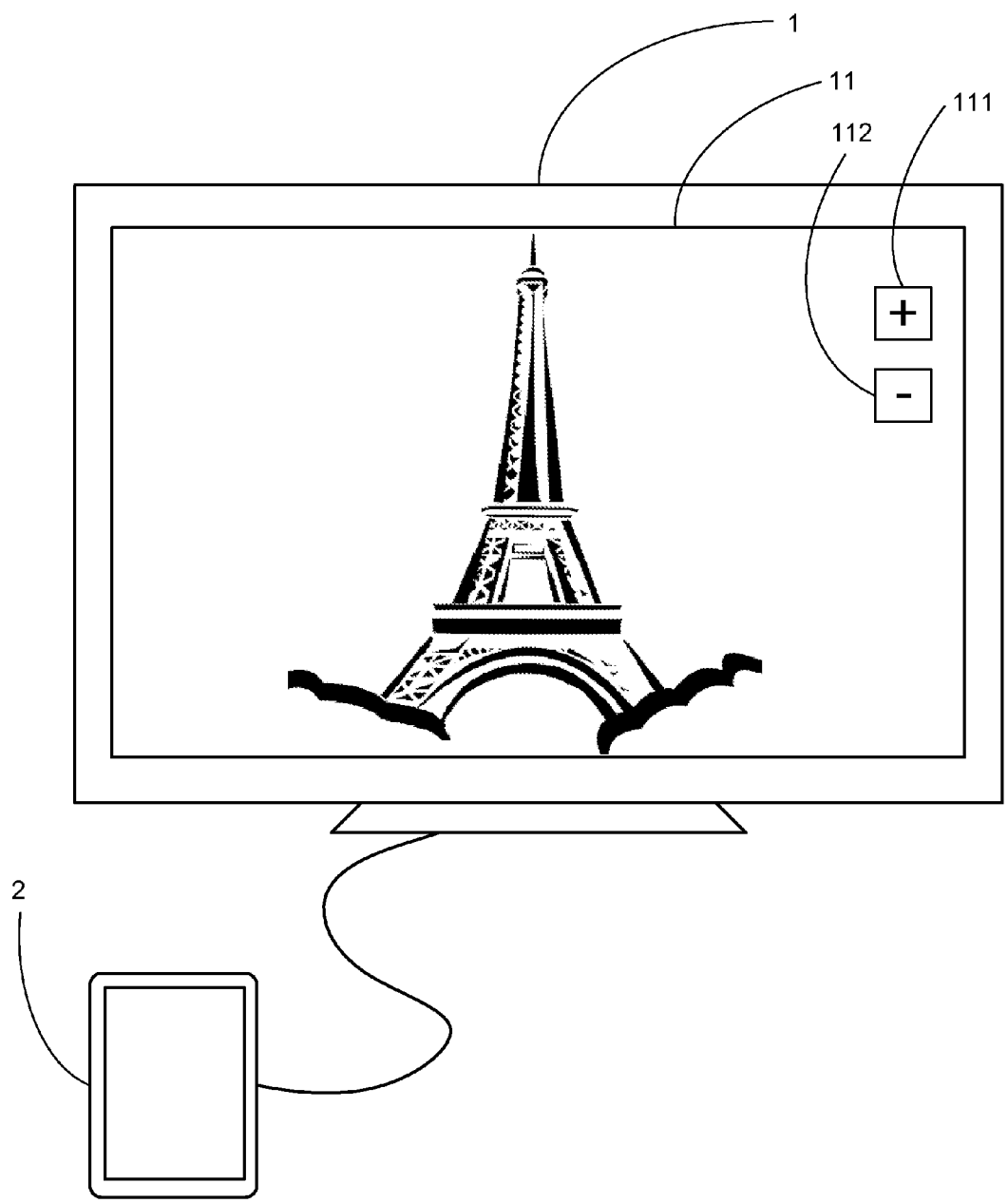
FIG. 2 is a flowchart of the invention.

Please refer to FIGS. 1 and 2. In step S1, a handheld computer 2, such as a smartphone or tablet computer, is electrically connected to a display 1 such as a TV set or monitor for outputting video signals to the display 1. The handheld computer 2 is installed with an application which makes an intermediary control between the handheld computer 2 and the display 1. Thus, as shown in FIG. 2, the display 1 can show a picture 11 from the handheld computer 2. The application adds a zoom-in key 111 and a zoom-out key 112 superposed on the picture 11, which are virtual and clickable.

Figure 3:
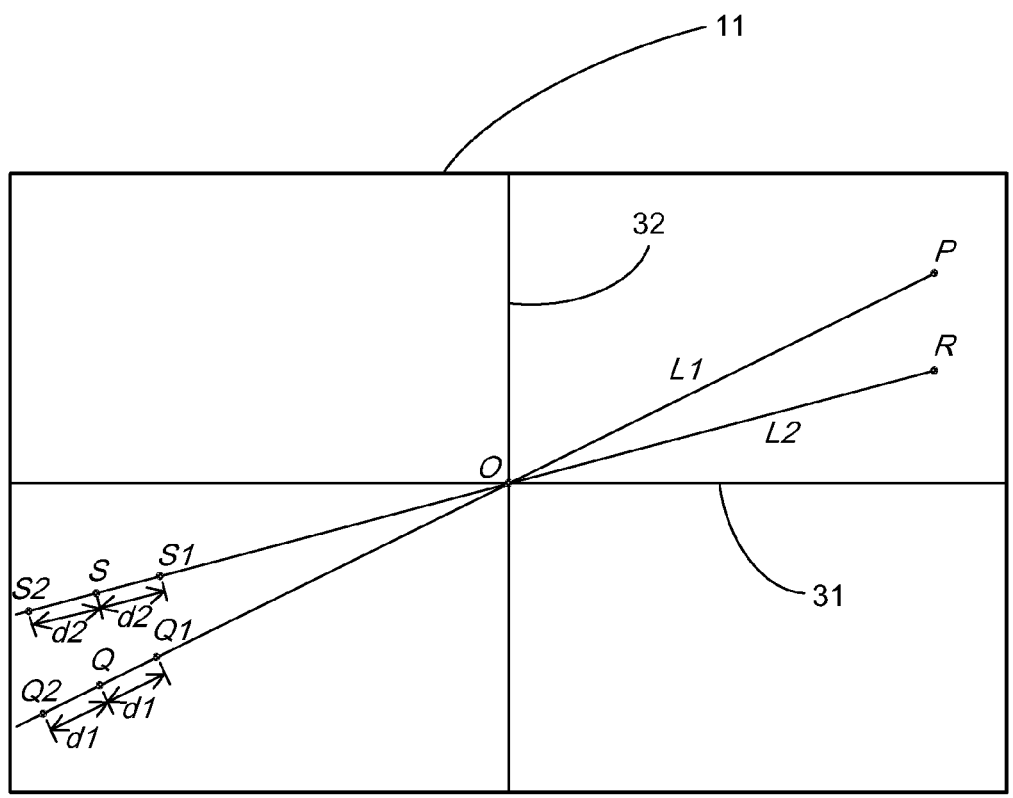
FIG. 3 is a schematic view showing the method of the invention.

Please refer to FIG. 3. In step S2, the application defines a rectangular coordinate system in the picture 11. The rectangular coordinate system is composed of an x-axis, a y-axis and an origin O. The origin O is located at the center of the picture 11. Next, in step S3, the application defines the positions of the zoom-in key 111 and zoom-out key 112 as a point P and a point R in the perpendicular coordinate system, respectively. And the application defines coordinates of the points P and R as (x1, y1) and (x2, y2), respectively. In step S4, the application draws a line L1 through the point P and a reflection point Q at (−x1, −y1) and another line L2 through the point R and another reflection point S at (−x2, −y2).

Next, in step S5, the application defines two points Q1 and Q2 on the line L1 beside the point Q, wherein the point Q1 is between the origin O and the point Q, the point Q is between the points Q1 and Q2, and a distance d1 between the points Q and Q1 is the same as that between the points Q and Q2. Identically, the application defines two points S1 and S2 on the line L2 beside the point S, wherein the point S1 is between the origin O and the point S, the point S is between the points S1 and S2, and a distance d2 between the points S and S1 is the same as that between the points S and S2. The distances d1 and d2 may be determined by the counts of continuously clicking the zoom-in key 111 or zoom-out key 112 in a short period of time, or determined by the time period of continuously pressing the zoom-in key 111 or zoom-out key 112. Double the distance d1 or d2 (2d1 or 2d2) is defined as a simulated operating distance. In detail, the more the counts of continuously clicking the zoom-in key 111 or zoom-out key 112 is or the longer the time period of continuously pressing the zoom-in key 111 or zoom-out key 112 is, the longer the distance d1 or d2 is. That is to say, the distance d1 or d2 is directly proportional to the counts of continuously clicking the zoom-in key 111 or zoom-out key 112 or the time period of continuously pressing the zoom-in key 111 or zoom-out key 112.

Figure 4:
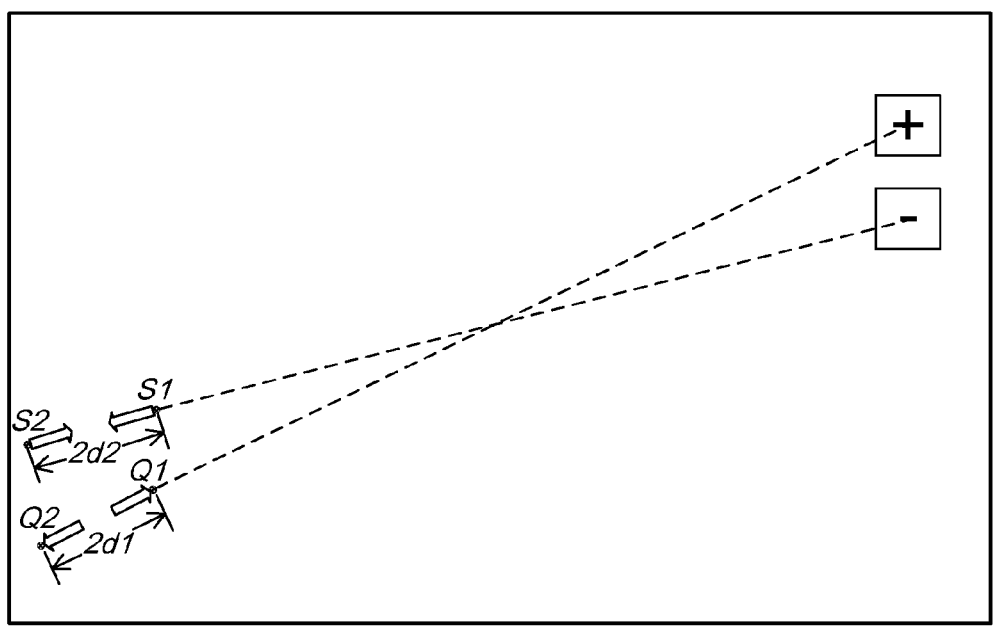
FIG. 4 is a schematic view showing a simulated zooming operation.

Finally, in step S6, the application creates a zoom event object corresponding to the simulated operating distance. The zoom event object will zoom in or out the picture 11 with centering on the origin according to a length of 2d1 (double d1) or 2d2 (double d2). In other words, as shown in FIG. 4, the application simulates a pinch-to-zoom-in operation when the zoom-in key 111 is continuously clicked or pressed, and the distance 2d1 is equivalent to an operating distance of a pinch-to-zoom-in operation. Similarly, the application simulates a pinch-to-zoom-out operation when the zoom-out key 112 is continuously clicked or pressed, and the distance 2d2 is equivalent to an operating distance of a pinch-to-zoom-out operation. The operating distance will determine a zooming ratio. The larger the operating distance is, the larger the zooming ratio is. As a result, the method of the invention can simulate a pinch-to-zoom function only with clicking a single virtual key, just like operating on a multi-touch screen.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for zooming picture with a single key, comprising the steps of:
   a) connecting a handheld computer to a display and displaying a picture from the handheld computer and a zoom key superposed on the picture;
   b) defining a rectangular coordinate system in the picture with an origin at a center of the picture;
   c) defining the zoom key as a point P in the perpendicular coordinate system and defining coordinates thereof as (x, y);
   d) drawing a line through the point P and a reflection point Q at (−x, −y);
   e) defining points Q1 and Q2 on the line beside the point Q, wherein the point Q1 is between the origin and the point Q, the point Q is between the points Q1 and Q2, a distance d between the points Q and Q1 is the same as that between the points Q and Q2, and double the distance d is defined as an imaginary operating distance; and
   f) creating a zoom event object corresponding to the imaginary operating distance.

2. The method of claim 1, wherein the zoom key is a zoom-in key.

3. The method of claim 2, wherein the step f) is to create a zoom-in event object.

4. The method of claim 1, wherein the zoom key is a zoom-out key.

5. The method of claim 2, wherein the step f) is to create a zoom-out event object.

6. The method of claim 1, wherein the distance d is determined by counts of continuously repeatedly clicking the zoom key.

7. The method of claim 1, wherein the distance d is determined by a time period of continuously pressing the zoom key.

* * * * *